April 26, 1955 H. SCHMIDTMANN 2,707,081
OPPOSED JAW GRANULATOR
Filed Jan. 3, 1951

INVENTOR.
HANS SCHMIDTMANN.
BY Thomas J. P. O'Brien
his ATTORNEY

United States Patent Office 2,707,081
Patented Apr. 26, 1955

2,707,081

OPPOSED JAW GRANULATOR

Hans Schmidtmann, Bochum, Germany, assignor, by mesne assignments, to Koppers Company, Inc., Pittsburgh, Pa., a corporation of Delaware Application January 3, 1951, Serial No. 204,173

8 Claims. (Cl. 241—266)

This invention relates to granulation apparatus (granulator) by which lumps of granular material may be redivided without changing the size of the original granules of the lumps. The field of application for such a granulator is for instance the treatment of ammonium sulphate, the crystals of which tend to conglomerate or cake thereby forming rather large lumps. It is, however, necessary to break the large lumps before the ammonium sulphate is used as a fertilizer without substantially changing the size of the ammonium sulphate crystals. In order to reduce to a minimum losses and waste of ammonium sulphate it is an object of my invention to improve the known granulation equipment most of which cause a destruction of the original grain size.

It is an object of my invention to provide a device for the granulation of salt crystals or other granular materials which effects a granulation without substantially changing the initial grain size of the material.

According to my invention the new granulator comprises two friction members which are moved simultaneously but in opposite direction to each other and consists of a number of stairs on each member, the steps of which are constructed as sieves or riddles in order to let a preferred granular size material pass through the sieves when crushed between the sieves and the strong crushing risers of the steps of the opposite friction members.

In a preferred form of the granulator, according to my invention, the oppositely moving friction members are arranged so as to approach each other near their lower ends while simultaneously the height and depth of the stairs are reduced from the top of the apparatus to its bottom, and the narrowest space between the members at their bottoms is maintained constant during their opposite movement by an arrangement of the apparatus as shown on the drawing, to form a slit like hole at their lower ends through which only a preferred grain sized material may pass.

Another feature of my invention is the provision of an opposite movement of the friction members, especially the provision of a reciprocatory, swinging or oscillating movement with displacement of the members toward each other on each stroke of the member during the reciprocation or oscillation.

When the lumpy granular material, for instance lumpy ammonium sulphate is fed into the top of the space between the friction members of the granulator, the large lumps and conglomerated pieces are crushed into several smaller lumps. The smallest particles which are formed by this grinding process fall through the sievelike steps of the friction stairs and are then kept out of the redividing area of the granulator. In the space between the friction members there will still remain only the lumpy pieces and crumbs which will be crushed again while descending into a lower part of the granulator. The grain size of the crushed granular material remains substantially the same as it was before the crystals had conglomerated.

Figure 1 of the drawing shows a diagrammatic vertical section of the granulator according to the invention.

Figure 1:
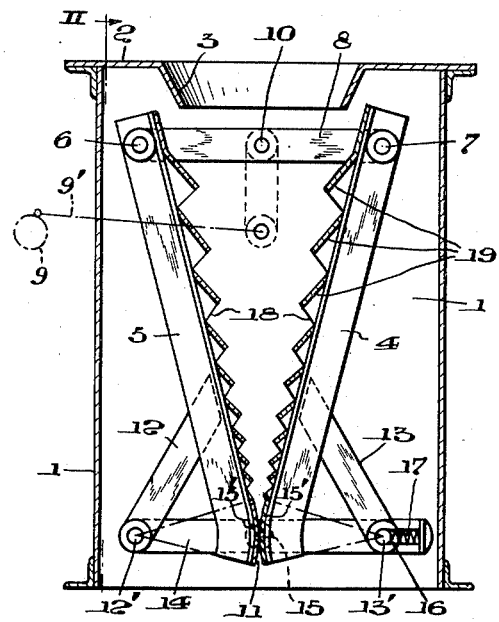
Figure 2:
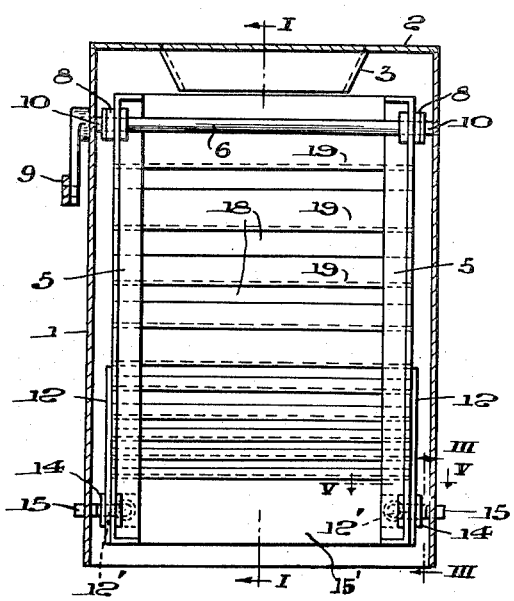
Figure 2 is a section taken on line 2—2 of Fig. 1.
Figure 3:
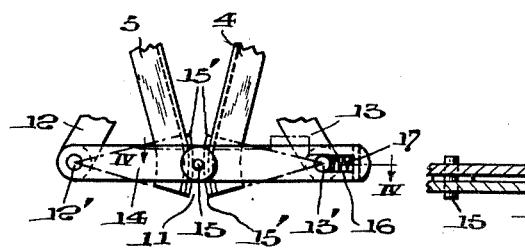
Figure 3 is an end elevational view of the spring urged, slotted, pivotal connection of the lower right hand half of the granulator taken on the line 3—3 of Fig. 2.
Figure 4:
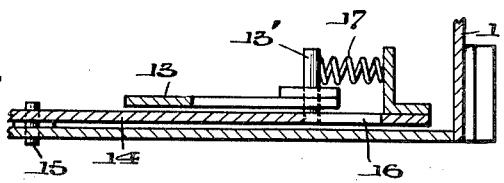
Figure 4 is a horizontal sectional view of the parts shown in Fig. 3 on line 4—4 thereof.
Figure 5:
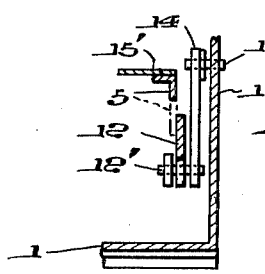
Figure 5 is a horizontal cross-sectional view taken on the line 5—5 of Fig. 2.

The granulator device is shown in a housing 1, the cover 2 of which is fitted with a funnel 3 for filling the material to be crushed into the granulator. Just below the funnel 3 are provided the two friction members 4 and 5 which are connected as shown in Fig. 1, equidistantly from a central axis 10, at their upper ends 6 and 7 to a double lever 8 which may swing on the central axis 10 seated in housing 1, and are driven by means of crank machinery 9 to oscillate the opposite ends of the levers alternately above and below the plane of the central axis 10.

The friction members 4 and 5 approach each other near their lower ends where they are curved as at 15' on an arc about pivots 12' and 13' and form a small or narrow slit 11 therebetween. They are supported to maintain a constant spaced relation between them at their lower parts by arms 12 and 13 which are rotatively connected at 12' and 13' to another double lever 14, equidistantly from the centre of motion 15, which is a pivot for bar 14, seating in housing 1, so that as the axis of rotation is within the slit and the axes 12', 13' of lower curved ends 15' of the stair members are equidistant from 15, curved ends 15 remain in constant space relation as their axes 12', 13' revolve around 15, the axes 12', 13' remaining 180° apart around 15, being fixedly held equidistant therefrom by bar 14 as bar rotates on axis 15, and circles around axes 12', 13' remain in spaced tangential relation to each other as they revolve around a circle or circumference around axis 15.

In addition while pivot 12' is fixed in lever 14, pivot 13' of arm 13 of the friction member 4 is slidably mounted on the double lever 14, a slot like hole 16 being provided in the lever 14 in which the friction member 4 is held forward relative to pivot 15 in a position as shown in the drawing, by means of a spring 17 to form the small slit 11, as the preferred small slit in the form of a hole, the preferred slit of course being thus a constant space through which only a preferred grain sized material may pass. This elastic manner of mounting the lower ends of the members 4, 5 is of advantage in vase harder materials, for instance large iron pieces, are mingled with the ammonium sulphate crystals permitting pivot 13' and arm 13 and member 4 to yield to pass the large iron pieces out through the slit 11.

The confronting faces of the friction members 4 and 5 are formed as stairs each stair comprising a lower strong crushing inclined, riser surface 18 and an upper sievelike oppositely inclined tread surface 19. The dimensions of the height and depth of the stairs become smaller from the top to the bottom of the granulator as may be seen on the drawing.

When the lumpy granular material is fed into the funnel 3 it will be crushed and ground between the friction members 4 and 5 after the crank machinery 9 has started moving. The large lumps are broken and the small pieces and crystals fall during the crushing through the sieves 19 thus escaping as they are crushed from the crushing operation area of the friction members 4 and 5. It is obvious that this manner of crushing is best to save the granular size of the material to be treated. The smaller lumps of the material sink down to a lower part of the granulator area where they are caught and crushed again by corresponding smaller stair surfaces 18.

During rotation of crank 9, the upper double lever 8 reciprocates to oscillate about the central axis 10. Hence, each end of lever 8 alternately rises above and falls below the horizontal plane of axis 10, as the other end simultaneously falls below and rises above said horizontal plane, and so too the lower double lever 14 about axis 15, due to the interconnection of levers 8 and 14 at their ends by rigid members 5, 12 and 4, 13.

As a consequence, the simultaneous up and down movements of the friction members 4, 5, results in both approaching each other during the portion of their travel away from the horizontal plane through axes 10, 15, on both strokes of their oscillating movement, thus causing crushing on their up stroke as well as on their down stroke, and hence increasing the crushing efficiency per cycle of operation of crank 9.

As lever 14 oscillates, when crank 9 is completely rotated, bars 4 rotate counter-clockwise for one-fourth revolution of crank 9, moving bar 4 on an arc upwardly toward axis 10 and bar 5 downwardly toward axis 15, on arcs around 15 toward the center of motion in the form of the vertical plane through axes 10 and 15, thus decreasing the space between bars 4 and 5 for crushing above the horizontal plane through 15.

On the next quarter revolution of 9, this movement is reversed, levers 8 and 14 moving clockwise and bringing the bars 4, 5 to their positions as shown in Fig. 1 on the drawing with the upper and lower levers 8 and 14 horizontal. This increases again the space between bars 4 and 5 allowing descent of material including newly incoming material from hopper 3.

On the third quarter of revolution of 9 bar 5 moves up and bar 4 moves down, with clockwise rotation of levers 4 and 5, for crushing action again but with the top of bar 5 moving up and in toward axis 10 and the top of bar 4 moving down and in toward axis 15.

On the final quarter revolution of crank 9, levers 8 and 14 rotate counter-clockwise again to their horizontal position, reversing the movement of bars 5 and 4 to their widest spaced relation again.

During all oscillations under crank 9, each part of arms 12, 13, and the lower inner portions 15' of bars 5, 4, move as a single unit in unison with each part of double lever 14, about the axis 15 fixed in wall 1.

Hence, any two parts of the circumferences around 12' and 13' when diametrically opposite each other through axis 15, during rotation of bar 14 around 15, remain in constant and fixed relation to such point 15 as the axis.

When the lower end 15' of member 4 is set on double lever 14 at a spaced distance relative to axis 15, all points of it around 13' remain fixed at that distance in any circumscribed movement around axis 15, and so too as to the lower end 15' of member 5 as to its axis 12', so that with repeated oscillations, the spacing of the slit in the horizontal plane through point 15 is constant, for regulation of the size of the largeness of the granulated material to be discharged. Spring 17 is set to hold the axis 16 forward at such preferred spacing, and to yield only on exertion of a stronger force, such as tramp iron to permit increase of the slit spacing 11 for passage of such objects of larger size.

Having now described my invention and in what manner the same may be performed I declare that it should not be limited to this specific embodiment but I wish to reserve to myself changes or variations which fall within the scope of the following claims.

What I claim is:

1. Granulator apparatus for redividing lumpy granular material comprising oppositely disposed friction members mounted for simultaneous reciprocatory movement in opposite directions relative to each other, for crushing lumpy granular material therebetween, each of said friction members comprising a series of stairs having inclined strong crushing riser surfaces and oppositely inclined tread sieve surfaces arranged one above the other, the tread sieve and crushing surfaces alternating in position on said friction members, the tread sieve surfaces on said friction members being disposed opposite each other and the crushing surfaces on said friction members also being disposed opposite each other when the two members are at one and the same elevation, whereby the crushing surfaces on each of the friction members coact with the sieve surfaces on the other of said friction members to crush lumpy material therebetween and also cause the smallest particles to simultaneously escape the crushing zone by passing through the sieves while passing the lumpy granular material from sieve to sieve downwardly between the space between the friction members for further crushing against the sieves when the friction members are simultaneously reciprocated in opposite directions, and means for reciprocating said members in opposite direction simultaneously.

2. Granulator apparatus for redividing lumpy granular material comprising: oppositely disposed friction members mounted for simultaneous reciprocatory movement alternately in opposite directions relative to each other for crushing lumpy granular material during passage therebetween; each of said friction members comprising a series of stairs having inclined strong crushing riser surfaces and oppositely inclined sieve tread surfaces, the tread sieve surfaces alternating in position with the riser surfaces on each member, and the riser surfaces on each member confronting the tread sieve surfaces on the opposite member for the escape of smallest particles of the granular material from the crushing area by passing through the sieves on each member during crushing action thereon by the crushing riser surfaces of the opposite friction member, and means for reciprocating said friction members in opposite directions simultaneously.

3. Granulator apparatus for redividing lumpy granular material comprising: oppositely disposed friction members mounted for simultaneous reciprocatory up and down movement alternately in opposite directions relative to each other with the members disposed at an angle to the vertical and converging from above, for crushing lumpy granular material during descent therebetween; each of said friction members comprising a series of stairs having downwardly directed strong crushing riser surfaces and upwardly directed sieve tread surfaces with the tread sieve surfaces alternating in position with the riser surfaces on each friction member, the tread surfaces on the friction members being disposed opposite each other and the riser surfaces also being disposed opposite each other when the friction members are at the same elevation, whereby the tread sieve surfaces of each of said friction members may be in coacting relation with the riser crushing surfaces on the other of said friction members during their reciprocation, to crush lumpy material therebetween and to cause the simultaneous escape of smallest particles of the granular material from the crushing area through the successive sieve tread surfaces on each friction member while passing the lumpy granular material from stair to stair downwardly in the space between the friction members for crushing again in lower parts of the granulator, when the friction members are simultaneously reciprocated; and means for reciprocating the opposite friction members upwardly and downwardly.

4. Apparatus as claimed in claim 3, and in which the stairs of the friction members become smaller in height and depth from the top to the bottom of the granulator.

5. Apparatus as claimed in claim 3, and in which the lower converging portions of the friction members approach each other to form a slit through which only a preferred sized grain size material may pass.

6. Apparatus as claimed in claim 3, and in which at least one of the friction members is yieldably mounted at its lower end for an increase of the space between the lower ends of the members for passage of harder material therethrough, and resilient means are operatively associated with said yieldably mounted member to form with the other member a preferred small slit at the lower end of the granulator for discharge from the lower end of the granulator of the residue of the granular material from the crushing area in the form of a preferred grain size material.

7. Apparatus as claimed in claim 3, and in which the lower converging ends of the oppositely disposed friction members terminate in oppositely curved portions on arcs about axes equidistant from a midpoint between the converging lower ends of the friction members and in spaced relation to form a discharge slit, and in which separate supporting means are provided for each of said lower ends each said means comprising an element engaging the lower end of its member to move the same toward and from the lower end of the other member, and guide means for guiding the element to move it and the lower end of its member toward and away from the lower end of the other member as its member rises and falls in its up and down reciprocation, to maintain a constant space relation within the slit as the lower ends of the two opposite members reciprocate in opposite direction.

8. Apparatus as claimed in claim 3, and in which the means for reciprocating the opposite friction members upwardly and downwardly comprises upper and lower rocker bars each pivoted to the opposite friction members at points equidistant from the center of rotation of the rocker bars.

(References on following page)

References Cited in the file of this patent

UNITED STATES PATENTS

| Number | Name | Date |
|---|---|---|
| 17,294 | Poore | May 12, 1857 |
| 52,837 | Fleck | Feb. 27, 1866 |
| 427,441 | Roth | May 6, 1890 |
| 591,891 | Skinner | Oct. 19, 1897 |
| 987,860 | Epps | Mar. 28, 1911 |
| 1,346,871 | Andresen | July 20, 1920 |
| 1,620,659 | Hodgkimson | Mar. 15, 1927 |
| 2,047,566 | Klingler | July 14, 1936 |
| 2,181,571 | Stearns | Nov. 28, 1939 |
| 2,294,572 | Reinecke | Sept. 1, 1942 |
| 2,485,718 | Ebersol | Oct. 25, 1949 |
| 2,554,697 | Conway | May 29, 1951 |

FOREIGN PATENTS

| Number | Country | Date |
|---|---|---|
| 200,711 | Germany | July 29, 1908 |